United States Patent [19]
Gelman et al.

[11] 3,831,759
[45] Aug. 27, 1974

[54] FUNNEL WITH MAGNETIC FILTER RETAINER

[75] Inventors: Charles Gelman; Attila Vadnay, both of Ann Arbor, Mich.

[73] Assignee: Gelman Instrument Company, Ann Arbor, Mich.

[22] Filed: Sept. 29, 1972

[21] Appl. No.: 293,427

[52] U.S. Cl............... 210/232, 55/DIG. 6, 55/490
[51] Int. Cl............................................. B01d 29/10
[58] Field of Search.... 210/232, 238, 455, 463–468; 55/490, DIG. 6, DIG. 31; 137/315

[56] References Cited
UNITED STATES PATENTS

| | | | |
|---|---|---|---|
| 498,276 | 5/1893 | Knight | 210/238 |
| 2,464,843 | 3/1949 | Becher | 210/238 X |
| 2,793,057 | 5/1957 | McGugin | 55/DIG. 6 |
| 3,240,341 | 3/1966 | Rosaen | 55/DIG. 6 |
| 3,269,608 | 8/1966 | Weber | 55/DIG. 6 |
| 3,295,686 | 1/1967 | Krueger | 210/455 |
| 3,616,622 | 11/1971 | Friedman | 55/490 X |

*Primary Examiner*—Theodore A. Granger
*Attorney, Agent, or Firm*—Barnes, Kisselle, Raisch & Choate

[57] ABSTRACT

A funnel with a spout assembly slidably received in the lower end of a reservoir assembly to releasably retain a filter disc therebetween. The reservoir and spout assemblies are yieldably urged toward each other to retain the disc therebetween by the attraction of a magnet on the spout assembly for a steel ring on the reservoir assembly.

12 Claims, 4 Drawing Figures

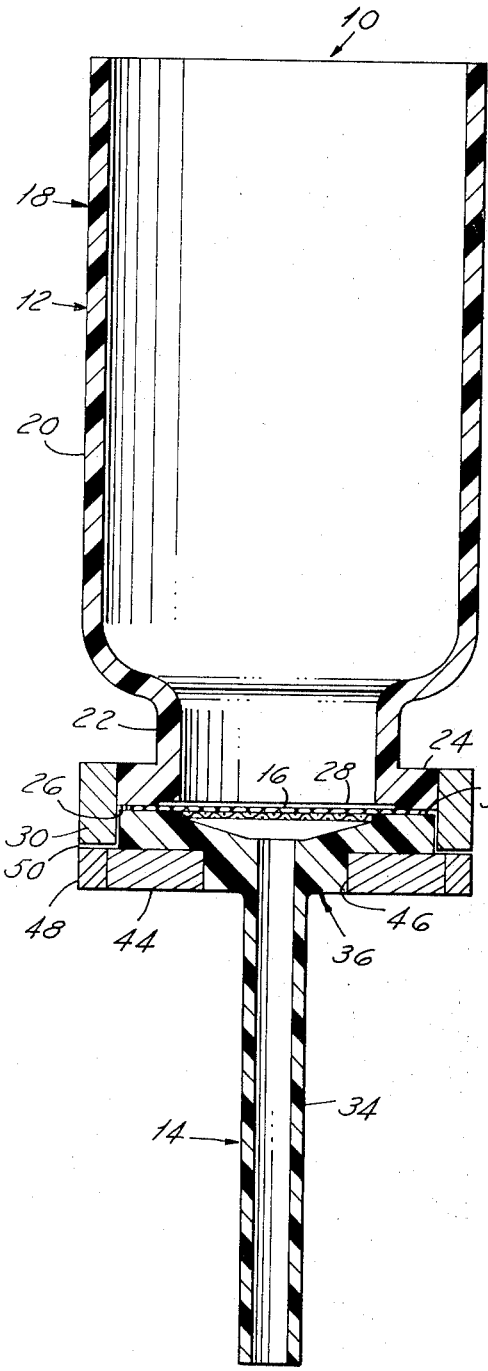
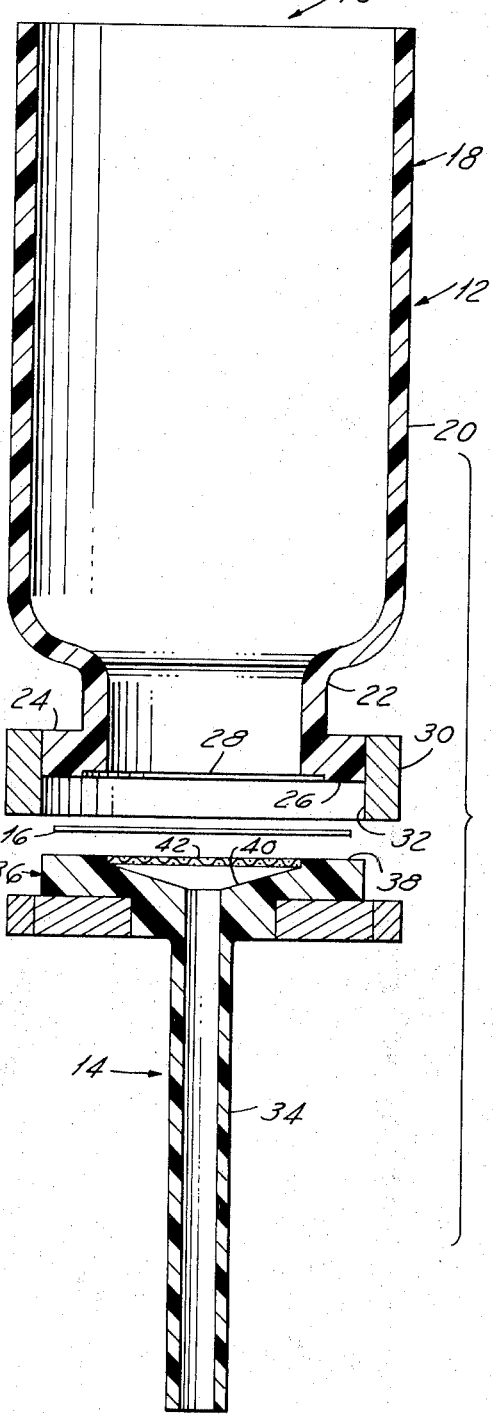

FUNNEL WITH MAGNETIC FILTER RETAINER

This invention relates to funnels and more particularly to funnels with replaceable filters therein.

Objects of this invention are to provide a funnel with a filter which can be easily and readily manually changed with one hand without using any tools, provides a satisfactory seal between the filter and funnel, is of economical manufacture and assembly, and is maintenance free.

These and other objects, features and advantages of this invention will be apparent from the following description, appended claims and accompanying drawings in which:

FIGS. 1 and 2 are sectional views of a funnel embodying this invention with the liquid reservoir and spout assemblies shown in connected and disconnected relation respectively to illustrate changing of a filter.

Figure 3:
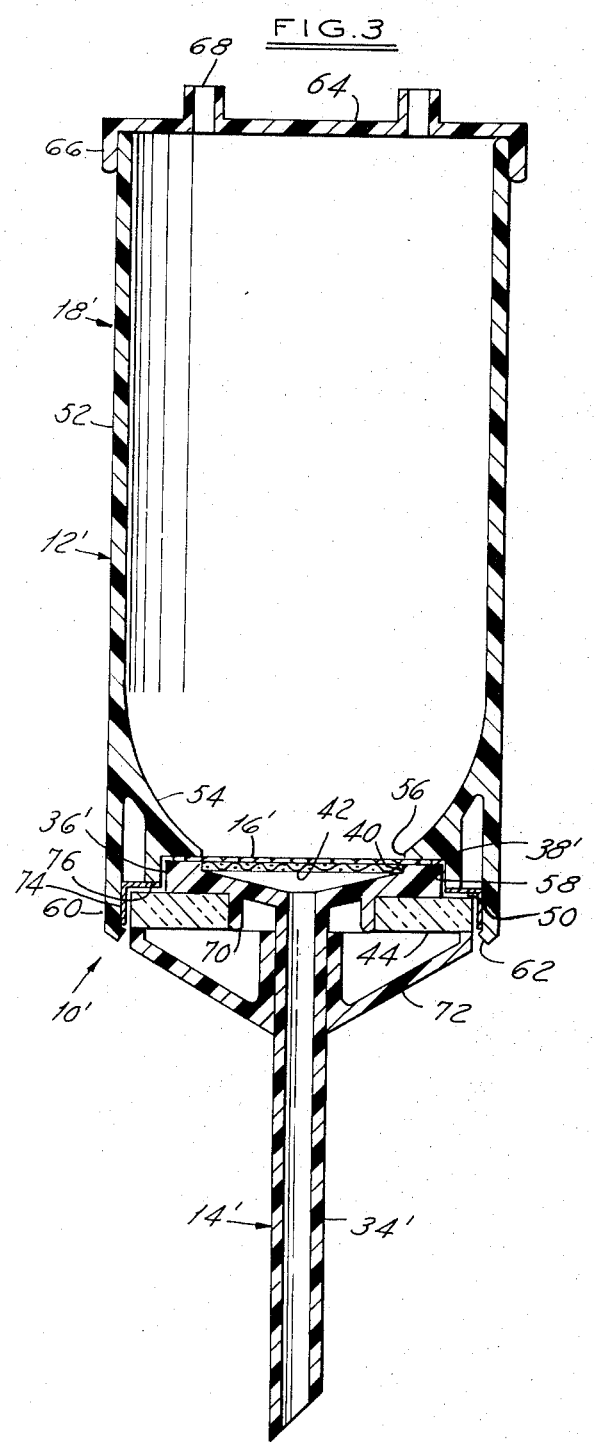
FIG. 3 is a sectional view of a modified funnel embodying this invention with the liquid reservoir and spout assemblies shown in connected relation with a filter therebetween.

FIGS. 1 and 2 illustrate a funnel 10 embodying this invention having a liquid reservoir assembly 12 and a spout assembly 14 adapted to be releasably connected with a disc of filter material 16 such as paper or an acetate membrane therebetween. Reservoir assembly 12 has a generally circular open ended liquid container 18 with a side wall 20 having a necked down portion 22 adjacent its lower end terminating in a radially outwardly extending circular flange 24. Flange 24 has a lower face 26 adapted to bear on a peripheral portion of filter disc 16 with a counterbore 28 therein providing a relieved portion of the flange overlying the central portion of filter disc 16. A continuous ring 30 of a ferromagnetic material such as steel is fixed to the outer periphery of flange 24 as by press fitting and extends below the flange to provide a generally circular recess 32 adapted to slidably receive the upper portion of spout assembly 14. Preferably, reservoir container 18 is made of a sterilizable material such as glass or a polycarbonate thermoplastic.

Spout assembly 14 has a depending tube or spout 34 with a generally cylindrical head 36 adjacent its upper end. Head 36 has an upper face 38 adapted to bear on filter disc 16 with a counterbore 40 therein in liquid communication with the upper end of tube 34. A filter support screen 42 is fixedly received in counterbore 40. A permanent magnet 44 in the shape of a continuous ring is press fit into a shoulder 46 in the lower face of head 36 and has a ring 48 of a ferromagnetic material such as steel fixedly received on its outer periphery as by press fitting. Preferably, tube 34 and head 36 of spout assembly 14 are made homogeneously integral of a sterilizable material such as a polycarbonate thermoplastic.

To install a filter disc 16 in funnel 10, reservoir and spout assemblies 12 and 14 are generally axially aligned as shown in FIG. 2 and the filter disc 16 is placed on the upper face 38 of spout assembly 14. Reservoir assembly 12 is then lowered over spout assembly 14 so that the upper portion of head 36 is freely slidably received in circular retainer opening 32 of the reservoir assembly 12. The lower face 26 of flange 24 and the upper face 38 of head 36 are urged into form gripping and sealing engagement with the opposed faces of disc 16 by the magnetic attraction of magnet 44 for steel ring 30 thereby releasably retaining and sealing disc 16 between the reservoir and spout assemblies.

To assure proper alignment of faces 26 and 38 for sealing engagement with filter disc 16, there is preferably a slight gap 50 between steel rings 30 and 48 when reservoir and spout assemblies 12 and 14 are coupled with filter disc 16 therebetween. The attraction of ring magnet 44 for steel ring 30 provides a uniform application of force by flat faces 26 and 38 around the entire periphery of filter disc 16 to provide a complete and adequate liquid tight seal between the filter disc and funnel 12. Preferably, the poles of the magnet or magnets carried by reservoir and/or spout assemblies 12 and 14 are oriented with respect to each other so that the reservoir and spout assemblies when axially aligned do not have to be positioned in any particular angular relationship to each other to produce the maximum magnetic force tending to retain and seal filter disc 16 therebetween. The need to couple reservoir and spout assemblies 12 and 14 in a particular angular relationship is eliminated by preferably using only one magnet 44 in the form of a continuous ring and a ferromagnetic ring 30 in funnel 10. The use of one magnet 44 in the form of a ring and a ferromagnetic ring 30 also provides a uniform distribution of the force urging reservoir and spout assemblies 12 and 14 into sealing engagement with filter disc 16 which improves the liquid seal between the filter disc and funnel 10.

A user of funnel 10 can easily and readily change or remove filter disc 16 from the funnel without using any tools by manually, even with only one hand, applying sufficient force to physically separate reservoir and spout assemblies 12 and 14 against the bias produced by magnet 44 and steel ring 30. When reservoir 12 and spout 14 are disconnected or separated, filter disc 16 can be removed and a new filter disc placed on the top surface 38 of head 36 of spout assembly 14. Reservoir 12 is then again lowered over spout assembly 14 to securely retain the filter disc in the funnel. The funnel is used in the conventional manner by pouring liquid to be filtered into reservoir assembly 12, allowing the liquid to pass through filter disc 16 and be discharged from spout assembly 14.

Figure 4:
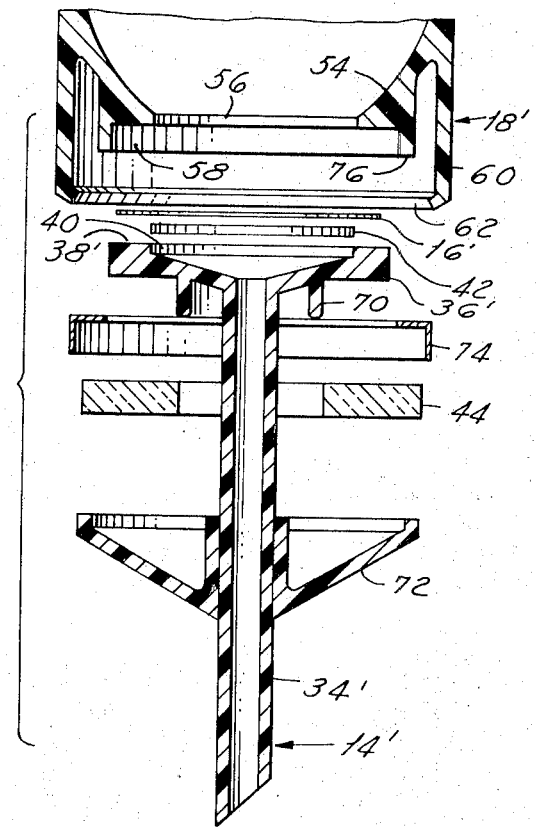
FIG. 4 is an exploded fragmentary sectional view illustrating the component parts of the modified funnel of FIG. 3.

FIGS. 3 and 4 illustrate a modified funnel 10' embodying this invention having a liquid reservoir assembly 12' and a spout assembly 14' adapted to be releasably connected with a disc of filter material 16' therebetween. Reservoir assembly 12' has a generally circular open ended liquid container 18' with a side wall 52 having a radially inwardly and downwardly extending portion 54 with a bore 56 therethrough and counterbore 58 therein adapted to receive spout assembly 14'. Side wall 52 has a portion 60 extending beyond and encircling inner wall portion 54 and terminating in a generally radially inwardly extending rib 62. A removable cover is provided for liquid container 18' by a cap 64 having a depending circular side wall 66 adapted to be frictionally received over the upper end of side wall 52 of the liquid container. Cap 64 has two apertures 68 therein to provide communication with the interior of liquid container 18' for such purposes as injecting liquid into the container or suspending instruments such as thermometers or various types of probes therein.

Spout assembly 14' has a depending tube or spout 34' with a generally cylindrical head 36' adjacent its upper end. Head 36' has an upper face 38' adapted to bear on filter disc 16' and a counterbore 40 therein which is in liquid communication with the upper end of tube 34' and fixedly received filter support screen 42 therein. Head 36' also has a depending circular rib 70 on its under face adapted to receive permanent magnet 44 thereon. Permanent magnet 44 is preferably frictionally received on rib 70 and is urged into firm engagement with head 36' by a generally conical retainer 72 frictionally received on spout 34'.

Magnet 44 cooperates with a ring 74 of a ferromagnetic material such as steel to retain spout assembly 14' in reservoir assembly 12'. Ring 74 has a generally L-shape cross section and preferably has an outside diameter slightly greater than the inside diameter of wall portion 60 of liquid container 18'. Thus, ring 74 is preferably retained in the lower end of liquid container 18' in firm engagement with surface 76 of inner wall portion 54 by being forced over radially inwardly extending rib 62 and press fit into the cavity formed by lower wall portion 60. Preferably, cap 64, liquid container 18', spout 34', head 38' and retainer 72 are made of a sterilizable material such as a polycarbonate thermoplastic.

Filter disc 16' is installed in and removed from funnel 10' in generally the same manner as the previously described installation and removal of filter disc 16 in filter 10 and, hence, the description of such installation and removal will not be repeated. Filter 10' has all the advantages and features of filter 10 and is better adapted for more economical manufacture and easy assembly of its component parts.

We claim:

1. A funnel with a filter releasably retained therein comprising a reservoir member for receiving a liquid and allowing the liquid received therein to pass through a filter, said reservoir member having a generally circular recess adjacent one end thereof for receiving the filter therein, a first surface in said recess engaging a peripheral portion of the filter when received in assembly in the funnel, a spout member having a head and a tube depending from the head for receiving and discharging a liquid from said reservoir member which has passed through the filter, said head having a generally circular portion receiving in assembly in said recess of said reservoir member, a second surface on said head engaging a peripheral portion of the filter when said head is received in assembly in said recess of said reservoir member, said spout member being manually releasable from said reservoir member, a permanent magnet in the form of a continuous ring carried by one of said members, and a continuous ring of a ferromagnetic material carried by the other of said members, one of said rings carried by said reservoir member adjacent said recess and the other of said rings carried by said spout member adjacent said head to urge said first and second surfaces of said reservoir member and said spout member into firm engagement with the filter to retain the filter in the funnel by the magnetic attraction of said permanent magnet for said ring of ferromagnetic material, whereby liquid received in said reservoir can pass through the filter and be discharged from said spout.

2. The funnel of claim 1 wherein said head has a counterbore therein adjacent said second surface thereof and also comprises a support screen received in said counterbore to provide support for the filter received in said funnel.

3. The funnel of claim 1 wherein said reservoir member terminates in a generally radially outwardly extending flange having a generally flat lower face with said first surface thereon for engaging the filter, one of said rings is received on said flange with a portion extending beyond said lower face thereof to provide at least in part said recess of said reservoir member, and said head has a cylindrical portion dimensioned such that it can be freely received within the portion of said one ring fixedly carried by said flange and extending below the lower face of said flange.

4. The funnel of claim 3 wherein one of said rings is frictionally received on said flange of said reservoir member and the other of said rings is frictionally received on said head of said spout member.

5. The funnel of claim 1 wherein said reservoir member comprises an open ended container of a sterilizable plastic material.

6. The funnel of claim 1 wherein said reservoir member has a generally circular wall portion encircling and extending beyond said recess thereof in the direction in which said recess opens to receive the filter and one of said rings is received adjacent said recess in frictional retaining engagement with said wall portion of said reservoir member.

7. The funnel of claim 6 wherein said spout member also comprises a retainer element frictionally received on said tube to retain the other of said rings on said spout member.

8. The funnel of claim 6 wherein said permanent magnet is carried by said spout member and said third means is carried by said reservoir member.

9. A funnel with a filter releasably retained therein comprising a reservoir member for receiving a liquid and allowing the liquid to pass through a filter, said reservoir member being an open-ended container having a recess adjacent one end thereof for receiving the filter therein, a first surface in said recess engaging a peripheral portion of the filter when received in assembly in the funnel, a spout member having a head and a tube depending from the head for receiving and discharging a liquid from said reservoir member which has passed through the filter, said head having a portion receivable in assembly in said recess of said reservoir member in a plurality of angular orientations of said reservoir and spout members to each other in aligned assembly, a second surface on said head engaging a peripheral portion of the filter when said head is received in assembly in said recess of said reservoir member, said spout member being manually releasable from said reservoir member, at least one permanent magnet carried by one of said members in a generally circular configuration adjacent the filter in assembly, and a ring of a ferromagnetic material carried by the other of said members such that said permanent magnet and said ring cooperate to urge said first and second surfaces into sealing engagement with the filter with a substantially uniform distribution of force on all points of engagement of said first and second surfaces with the filter with said permanent magnet and said ring producing a magnetic force of substantially the same magnitude regardless of the angular orientation of said reservoir and spout members to each other in aligned assembly to retain the filter in said funnel by the magnetic attraction of said permanent magnet and said ring, whereby liquid received in said reservoir member can pass through the filter and be discharged from said spout member without leaking between said reservoir and spout members.

10. The filter of claim 9 wherein said permanent magnet is in the form of a continuous ring.

11. The funnel of claim 10 wherein said reservoir member terminates in a generally radially outwardly extending flange having a generally flat lower face with said first surface thereon for engaging the filter, one of said rings is received on said flange with a portion extending beyond said lower face thereof to provide at least in part said recess of said reservoir member, and said head has a cylindrical portion dimensioned such that it can be freely received within the portion of said one ring fixedly carried by said flange and extending below the lower face of said flange.

12. The funnel of claim 10 wherein said reservoir member has a generally circular wall portion encircling and extending beyond said recess thereof in the direction in which said recess opens to receive the filter and one of said rings is received adjacent said recess in frictional retaining engagement with said wall portion of said reservoir member.

* * * * *

PO-1050
(5/69)

UNITED STATES PATENT OFFICE
CERTIFICATE OF CORRECTION

Patent No. 3,831,759                Dated August 27, 1974

Inventor(s) Charles Gelman and Attila Vadnay

It is certified that error appears in the above-identified patent and that said Letters Patent are hereby corrected as shown below:

Col. 3, line 47, change "receiving" to -- receivable --.

Signed and sealed this 19th day of November 1974.

(SEAL)
Attest:

McCOY M. GIBSON JR.           C. MARSHALL DANN
Attesting Officer             Commissioner of Patents